United States Patent [19]

Frost et al.

[11] 4,265,023
[45] May 5, 1981

[54] TURBINE BLADE GROWTH MEASURING APPARATUS AND METHOD

[75] Inventors: Stuart J. Frost, Bloomfield; Edward J. Riley, Somers; Ronald F. Bogdan, Glastonbury, all of Conn.

[73] Assignee: United Technologies Corporation, Hartford, Conn.

[21] Appl. No.: 32,608

[22] Filed: Apr. 23, 1979

[51] Int. Cl.³ .................... G01B 11/02; G01B 5/02
[52] U.S. Cl. ............................. 33/174 C; 33/125 A
[58] Field of Search ............ 33/125 R, 125 A, 174 R, 33/174 C; 356/247; 415/118, 191, 212 R, 216

[56] References Cited

U.S. PATENT DOCUMENTS

| | | | |
|---|---|---|---|
| 3,078,583 | 2/1963 | Chase et al. | 33/174 P |
| 3,231,982 | 2/1966 | Ribich | 33/125 A |
| 3,355,810 | 12/1967 | Franklin | 33/125 A |
| 3,535,793 | 10/1970 | Williams et al. | 33/125 A |
| 3,832,785 | 9/1974 | Miller | 33/174 C |

FOREIGN PATENT DOCUMENTS

| | | | |
|---|---|---|---|
| 927588 | 5/1963 | United Kingdom | 33/174 C |
| 1209478 | 10/1970 | United Kingdom | 415/216 |

*Primary Examiner*—Richard R. Stearns
*Attorney, Agent, or Firm*—Norman Friedland

[57] ABSTRACT

Turbine blade growth is measured by judiciously locating a prescribed dimple on the blade remote from the root and indexed in a fixture relative to a master blade. An optical micrometer affixed to the fixture can be readily adapted to facilitate the measurement technique.

5 Claims, 4 Drawing Figures

U.S. Patent     May 5, 1981     4,265,023
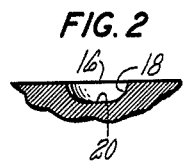
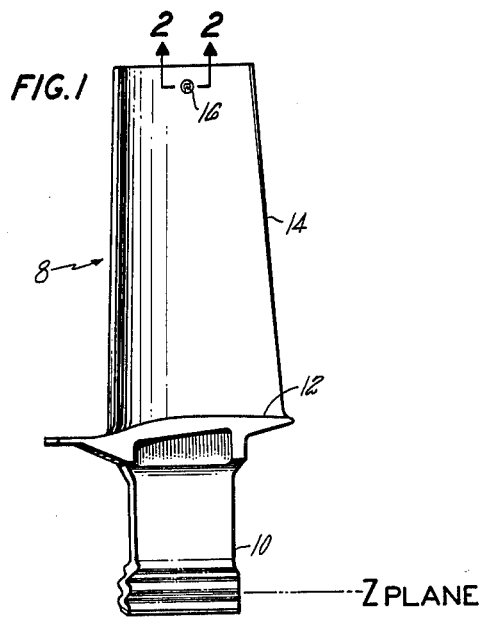
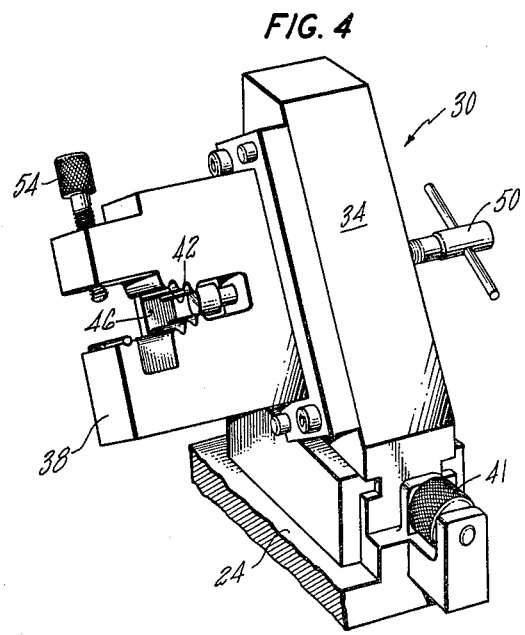
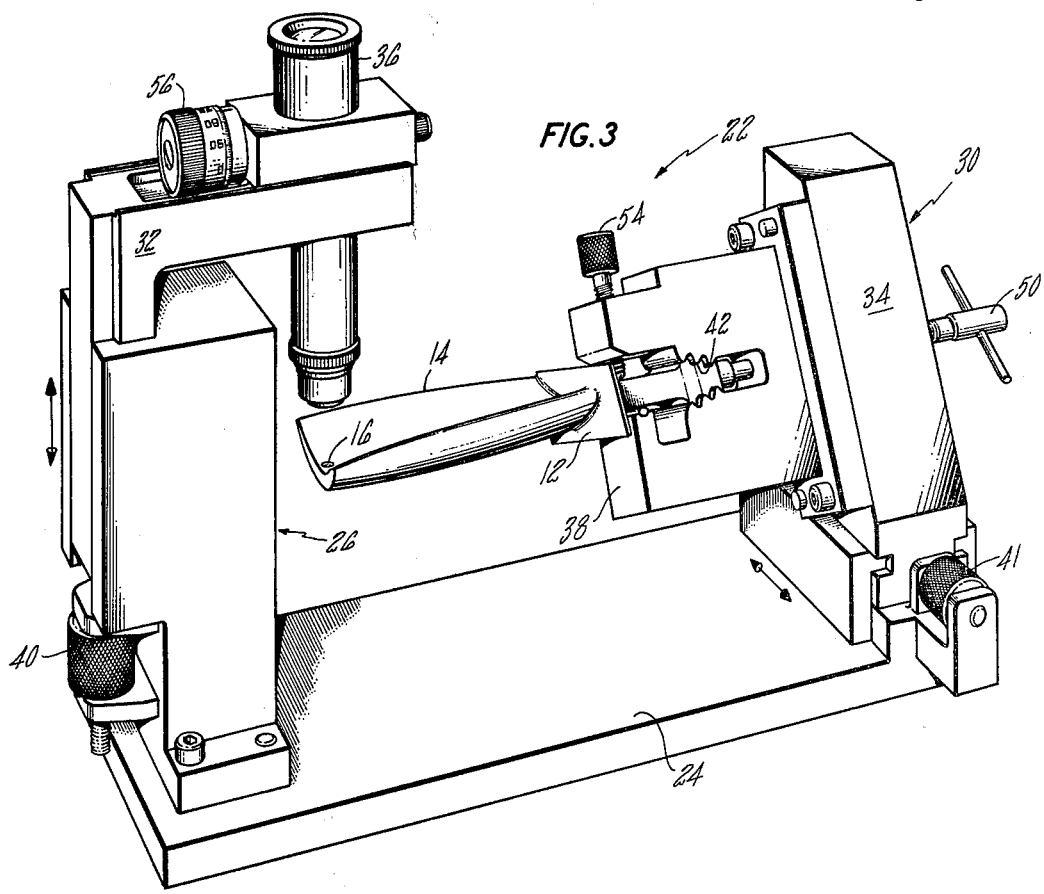

TURBINE BLADE GROWTH MEASURING APPARATUS AND METHOD

BACKGROUND OF THE INVENTION

This invention relates to apparatus and technique for measuring the growth of turbine blades of a gas turbine engine.

Because of the hostile environment to which the turbine blade of a jet engine is subjected, it has over the years been an almost impossible task to achieve its growth measurement with any degree of accuracy. As is well known, the growth is a vital parameter as it is an indication of its life and more importantly its life expectancy. Should a blade exceed a predetermined growth, it becomes vulnerable to destruction and for maintenance and safety reasons it is desirable to replace such blade before such occurrence. Obviously, if the measurement is not accurate the blade may either be prematurely discarded or that it could be re-installed having a life expectancy level beyond the limit of the part resulting in premature blade fracture. It has been desirable to achieve absolute accuracy and repeatability in this measurement.

While it would be desirable to make a direct physical measurement of the blade growth by conventional measuring instruments such as a micrometer, the blade structure in many instances precludes such measurements. Other techniques, like scribing a line on the face of the blade is also not acceptable inasmuch as it would not only introduce a stress area but as a result of erosion caused by the extreme operating environment, the scribe line would become obscured in time. Placing a deeper groove to counter this problem would only make matters worse. A deep groove is very difficult to coat with corrosive and oxidation preventative materials, thereby allowing for early corrosive attack and subsequent failure.

We have found that we can achieve a high degree of accuracy and repeatability in blade growth measurement and obviate the above problems by judiciously locating a dimple on the concave outer surface of the blade. The dimple is so conformed that the erosion and wear of the blade does not affect its availability after repeated usage. The absolute surface condition of the blade in no way influences the measurement to be taken. The location of the dimple makes the growth measurement independent of the actual physical condition of the blade. Moreover, the dimple does not in any way affect the stress or aerodynamics of the blade.

SUMMARY OF THE INVENTION

A feature of this invention is the accuracy and repeatability achieved in measuring growth of a turbine blade for a jet engine by placing a dimple having a substantially round shaped bottom surface and nearly vertical side wall. The dimple is essentially shaped like a soup bowl as opposed to the shape of a cone. Another feature is a fixture for securing the blade so that it aligns with a plane (Z plane) in the locking jaws relative to an optical micrometer. Means are provided to accurately index and secure the blade to achieve repeatability in its measurement. Another feature of this invention is the method of measuring blade growth.

Other features and advantages will be apparent from the specification and claims and from the accompanying drawings which illustrate an embodiment of the invention.

BRIEF DESCRIPTION OF THE DRAWINGS

FIG. 1 is a plan view of a typical turbine blade with the dimple formed on the concave outer surface of the blade;

FIG. 2 is a partial view taken along the line 2—2 of FIG. 1;

FIG. 3 is a perspective view showing the measuring fixture with a blade secured thereby in readiness for a measurement; and FIG. 4 is a partial view in perspective showing the details of the jaw with the blade removed.

DESCRIPTION OF THE PREFERRED EMBODIMENT

As can be seen in FIG. 1, a typical axial turbine blade 8 comprises the root section 10 having a fir tree type of securing portion, platform 12 and the bucket portion 14. The dimple 16 is formed on the concave surfaces of the blade on the outer extremity relative to the root section. As noted in FIG. 2, the dimple is formed in somewhat a bowl shape noting that the side wall 18 curvature is relatively steep and the bottom 20 of the recess is relatively flat. The full radius round dimple 16 is formed this way so that after usage where the erosion and distortion has occurred, the bottom of the dimple remains visible.

An arbitrary, but constant point is selected from the root of the blade, referred to as the Z plane and the measurement is taken from it to the center of the dimple. This distance is the parameter used at the base and the growth is measured relative to this parameter. Inasmuch as many blades will be compared with this distance a master is selected for a given blade. Hence, the operator merely has to compare the used blade with the master and the master is used to set up the fixture 22 (FIG. 3) for measuring growth as will be described hereinbelow.

As noted from FIGS. 3 and 4, the fixture 22 comprises a base section 24, a microscope supporting section 26 and a blade supporting section 30. The supporting sections 26 and 30 have running slots formed therein for slidably supporting the carriages 32 and 34 which carry microscope 36 and the support jaws 38 respectively. Suitable lead screws (partially shown) serve to traverse the carriages rectilin-early by turning the knurled turn nuts 40 and 41.

For this particular application the supporting jaw 38 has a fir tree groove 42 cut therein to accommodate the fir tree root of the turbine blade 8. A stop plate 46 is mounted on one side of the groove for preventing the blade from falling out and acting as a stop. A threaded jack member 50 abuts the end of the blade and wedges it against the fir tree grooves for aligning the blade relative to the Z plane. Obviously, every blade will be in the same relative position for making the measurement. A locking screw 54 bears against the blade for securing it in the position shown, once the blade is firmly affixed in the Z plane alignment.

A suitable, commercially available optical micrometer having a display screen with fixed dimensional increments and a series of concentric circles that move with rotation of the micrometer dial 56 is utilized in the preferred embodiment. The fixed dimensional increments indicate the true full distance from the Z plane in 0.001 inch increments. It should be noted as one skilled in the art will appreciate other optical measuring devices can be utilized such as a shade graph without departing from the scope of this invention.

In operation, the instrument is initially calibrated using a "master" blade which is installed in the supporting jaw by bearing the threaded jack member 50 against the bottom of the root forcing the fir tree root against the fir tree groove and locked in position with the blade in alignment with the Z plane. The floating concentric circles in the micrometer are visually centered over the blade dimple by rotating the micrometer dial spingle 56. The blade dimple location is read directly off the numerical display. While it is advantageous to use concentric circles in the microscope display screen, cross hairs can likewise be utilized. Once the instrument is set with the master the blades being measured are similarly secured in the fixture and the location of the dimple is read through the micrometer.

It should be understood that the invention is not limited to the particular embodiments shown and described herein, but that various changes and modifications may be made without departing from the spirit and scope of this novel concept as defined by the following claims.

We claim:

1. Apparatus for measuring the growth of a turbine blade subjected to hostile environment of a turbine type of power plant in combination with the turbine blade, the blade having a concave working surface and a root section adapted to be secured in a rotary hub, a dimple in the concave working surface in proximity to but spaced from the end of the turbine blade remote from said root section, a pair of spaced apart upstanding members, one of said members having jaw means for securing the root section of the blade for holding the blade, an optical measuring means secured by said other of said members for aligning with said dimple, aligning means in said jaw means for aligning said root with a predetermined plane passing through a point in said root known to be the original distance between the center of the dimple and said plane and means for positioning said optical measuring means to align with said dimple to the new growth position of the blade which new position is the value of said distance between the center of the dimple and said plane.

2. The combination of claim 1 wherein the one of said members with the jaw means includes a bed-like element, and a translating element slidably supported therein and means for positioning said jaw means transversely relative to said optical microscope.

3. The combination of claim 2 wherein said jaw means having wall surfaces defining transverse open ended slots formed to cooperate with and accommodate the root of said turbine blade, a closure on one end of said open ended slots to stop said turbine blade in a given position, said aligning means in said jaw means for the alignment of said plane being a retractable member supported in said translating element to bear against the end of the root section to position said blade axially to bear up against a portion of said wall surfaces in said transverse open ended slots.

4. The combination of claim 3 including another bed-like element and a vertically translating element slidably supported therein for positioning said optical measuring means.

5. The method of measuring the growth of a turbine blade that is subjected to the hostile environment of a turbine type of power plant comprising the steps of:
- forming a circular disk-shaped recess on the concave curvature of the blade at a location spaced from the working end remote from a given point on the root of the blade,
- calibrating by viewing with an optical measuring device the circular disk-shaped recess the distance from said given point to the circular disk-shaped recess,
- after actual use of said blade in the power plant recalibrating the distance from said given point to the circular disk-shaped recess.

* * * * *